(12) United States Patent
Patricio et al.

(10) Patent No.: US 11,770,156 B2
(45) Date of Patent: Sep. 26, 2023

(54) SYSTEM AND METHOD FOR MANAGING COMMUNICATION BETWEEN CONTACTLESS DEVICES

(71) Applicants: STMicroelectronics Austria GmbH, Graz (AT); STMicroelectronics Razvoj Polprevodnikov D.O.O., Ljubljana (SI)

(72) Inventors: Gustavo Jose Henriques Patricio, Graz (AT); Anton Stem, Preddvor (SI)

(73) Assignees: STMicroelectronics Austria GmbH, Graz (AT); STMicroelectronics Razvoj Polprevodnikov D.O.O., Ljubljana (SI)

( * ) Notice: Subject to any disclaimer, the term of this patent is extended or adjusted under 35 U.S.C. 154(b) by 0 days.

(21) Appl. No.: 17/651,322

(22) Filed: Feb. 16, 2022

(65) Prior Publication Data

US 2022/0263542 A1 Aug. 18, 2022

(30) Foreign Application Priority Data

Feb. 17, 2021 (EP) ..................................... 21157687

(51) Int. Cl.
*H04B 5/00* (2006.01)
*H04W 4/80* (2018.01)
*H04W 48/16* (2009.01)

(52) U.S. Cl.
CPC ............ *H04B 5/0031* (2013.01); *H04W 4/80* (2018.02); *H04W 48/16* (2013.01)

(58) Field of Classification Search
CPC ..... H04B 5/0031; H04B 5/0068; H04W 4/80; H04W 48/16; H04W 12/088; H04W 12/37; H04W 12/47; H04W 28/04; H04W 28/065; H04L 1/0061; G06K 17/0029
USPC ...................................................... 455/41.1
See application file for complete search history.

(56) References Cited

U.S. PATENT DOCUMENTS

| 7,007,208 | B1* | 2/2006 | Hibbert ..................... H04L 1/24 341/51 |
| 2009/0144550 | A1 | 6/2009 | Arunan |
| 2014/0086336 | A1* | 3/2014 | Wang ..................... H04N 19/44 375/240.26 |
| 2021/0195632 | A1* | 6/2021 | Jungnickel .......... H04W 74/008 |

FOREIGN PATENT DOCUMENTS

EP 3667934 A1 6/2020

* cited by examiner

*Primary Examiner* — Eugene Yun
(74) *Attorney, Agent, or Firm* — Slater Matsil, LLP

(57) ABSTRACT

The disclosure relates to a modified NFC framing is used by a reader and selected devices during at least a part of the communication between the reader and the selected devices. The reader and the selected devices store modification rules for modifying the frames. Devices not storing those modification rules will discard the received modified frames.

27 Claims, 8 Drawing Sheets

| Standard | CRC Polynomial | STDIV | MIV | Invert |
|---|---|---|---|---|
| ISO14443A | | 0x6363 | MIV0 | No |
| ISO14443B | ISO13239 | 0xFFFF | MIV1 | Yes |
| FeliCa | $x^{16} + x^{12} + x^5 + 1$ | 0x0000 | MIV2 | Yes |
| ISO15693 | | 0xFFFF | MIV3 | Yes |

SYSTEM AND METHOD FOR MANAGING COMMUNICATION BETWEEN CONTACTLESS DEVICES

CROSS-REFERENCE TO RELATED APPLICATIONS

This application claims the benefit of European Patent Application No. 21157687.1, filed on Feb. 17, 2021, which application is hereby incorporated herein by reference.

TECHNICAL FIELD

Embodiments of the invention relate to the field of contactless communication, for example near field communication (NFC), and more particularly the framing used during communication between contactless devices.

BACKGROUND

Near field communication, better known to those skilled in the art under the name NFC (Near Field Communication), is a wireless connectivity technology that allows communication over a short distance, for example 10 cm, between electronic devices, such as contactless smart cards or labels or mobile devices, and readers.

NFC technology is particularly suitable for connecting any type of user device and allows for quick and easy communications.

A contactless device is a device capable of exchanging information via an antenna with a contactless reader, according to a contactless communication protocol.

An NFC device, which is a contactless device, is a device compatible with NFC technology.

NFC technology is an open standard technology platform in ISO/IEC 18092, ISO/IEC 21481, NFC Forum and EMVCo but incorporates many existing standards such as the Type A and Type B protocols defined in ISO-14443, ISO-15693 (type V) or FeliCA JIS X6319-4 (type F), which can be communication protocols that can be used in NFC technology.

Contactless technology can also be used in Radio Frequency IDentification (RFID) devices compatible with ISO 15693 and ISO 18000-3.

When transmitting information between a reader and a device, the reader generates a magnetic field via its antenna which is, generally in the standards conventionally used, a sine wave (the carrier) at 13.56 MHz.

To transmit information from the reader to the device, the reader uses an amplitude modulation of the carrier.

The device comprises a processor configured to demodulate the received carrier in order to obtain the data transmitted from the reader.

For an information transmission from the device to the reader, the reader generates the magnetic field (the carrier) without modulation.

The device antenna then modulates the field generated by the reader, according to the information to be transmitted. The frequency of this modulation corresponds to a subcarrier of the carrier. The frequency of this subcarrier depends on the communication protocol used and can be for example equal to 848 kHz.

This modulation is performed by modifying the load connected to the terminals of the device antenna.

Two modes of operation are then possible, a passive mode or an active mode.

In the passive mode, the device retro-modulates the wave coming from the reader to transmit information and does not integrate, for the transmission of information, a transmitter itself, or an emitter, capable for example of generating its own magnetic field during the broadcast. Such a device devoid of transmitter is called a passive device, as opposed to an active device that includes a transmitter.

Generally, a passive device is devoid of power because it uses the wave from the reader to power its integrated circuit.

In the active mode of operation, both the reader and the active device generate an electromagnetic field. Generally, this mode of operation is used when the active device is provided with a power source, for example a battery.

Each of the NFC devices (reader and device) transmits the data using a modulation scheme. Here again, the modulation results in an effect similar to load modification and this is then referred to as active load modulation (ALM) communication.

Compared to a passive communication mode, larger operating distances of up to 20 cm are obtained depending on the protocol used.

Moreover, the use of active load modulation makes it possible to use very small antennas.

ALM needs to be used in case the signal generated by passive load modulation is not strong enough to be detected by a reader. This is the case when a device's antenna is small or located in a challenging environment.

Embodiments of the invention apply to all kinds of contactless devices, passive devices or active devices.

As explained above NFC is a ubiquitous technology based on well-known standards in the industry. NFC frames used during communication rely on a well-defined format per technology. Thus, all devices supporting that technology will receive and decode individual frames.

Open characteristics of NFC are pivotal for applications that require interoperability but present some drawbacks for deployment of NFC in some systems:

a) NFC communication can be easily eavesdropped and parsed as payload format is common knowledge;

b) NFC systems without robust security mechanisms are subject of replay attacks;

c) As NFC frames rely on a well-defined format per technology, all devices supporting that technology will receive and decode individual frames, but frames that may not be intended for certain recipients or devices of the NFC system will cause the reception and processing of the frames to be later discarded on an application layer.

Concerning a) and b), existing solutions based on advanced encryption and session mechanisms are robust but also costly.

And while such strong level of security might be necessary for certain high cost/risk systems, these may be not justifiable for NFC systems addressing low-cost applications (e.g., disposable accessories).

Concerning c), processing the received payload requires energy, which is harvested from the reader's RF carrier.

And the presence of multiple tags and their processing even when the received frames are not intended for certain tags may negatively impact on the energy consumption of the reader and on the maximum communication distance.

There is thus a need for another solution for improving security and communication distance, in particular in the presence of multiple tags.

SUMMARY

According to an embodiment, it is proposed to prevent as much as possible replay attacks.

According to an embodiment, it is also proposed to improve communication range, in particular in presence of multiple tags.

According to an aspect, a method is proposed for managing a communication between a first contactless device and a second contactless device.

The devices exchange during the communication, frames having a frame format (or structure) compliant with a contactless communication standard and comprising a start of frame field, an end of frame field, a payload field and an error check field calculated from the payload field according to a way compliant with the communication standard.

The method according to this aspect comprises storing modification rules in both devices, and for at least a part of the communication (or for the whole communication): having the first device modify, in accordance with the modification rules, the content of at least one frame element of each frame of the at least a part of the communication so that the modified content of the at least one frame element is different from a reference content of the at least one frame element compliant with the communication standard, the at least one frame element including the start of frame field or the end of frame field or the payload field or the error check field, having the first device send the modified frame to the second device, having the second device receive the modified frame and analyze the at least one modified frame element in accordance with the modification rules, and having the second device continue the communication if the second device recognizes the at least one modified frame element.

Thus the method according to this aspect proposes to keep the standardized frame format or structure (keeping the same fields as those included in a standardized frame) of a frame but to modify for example the content of at least one frame element (for example one or more fields), for example the start of frame field, leading such modified frames to be handled only by a specific NFC systems(s), i.e. including for example a reader and tags all storing the modification rules permitting to modify the content, while standard NFC devices for example shall ignore these modified frames.

Attacks using common off-the-shelf tools may be prevented and eavesdropping may be impaired with basic tools as these tools support defined NFC technologies and standardized frames.

The complexity in manipulating Tags is increased as default readers tools may support only the common NFC Technologies (off-the-shelf tools, NFC enabled smartphones, etc.), contributing thus also to attacks prevention.

Replay attacks can be also prevented in a large scale if individual systems use specific modification rules (one modification rule per system), or between each Tag if each one uses an individual modification rule (one modification rule per Tag).

The method according to this aspect introduces thus certain level of preventive mechanisms while keeping the systems offline and without costly and complex encryption and session mechanisms.

Further frame acceptance/rejection (device addressing) is advantageously performed during actual reception. There is thus no need for application layer to parse/digest payload content.

Tags can reject unexpected frames, eliminating the need to harvest power from the RF Field from an early moment of the communication, in particular and very advantageously when the content of the start of frame has been modified.

Being so, the energy emitted from the reader can be conserved for, when the addressed tag needs to digest and take action, improving the communication range (when power limited).

As indicated above, according to an advantageous embodiment, the at least one frame element comprises the start of frame field.

According to an embodiment, the modification rules include a set of functions, and modifying the content of at least one frame element comprises applying at least one of these functions to the reference content of the at least one frame element to obtain the modified content different from the reference content.

When the at least one frame element is the error check field, modifying the content of the error check field may comprise calculating the content of the error check field in a different way than the one indicated in the communication standard.

Both devices may apply the modifications rules from the beginning of the communication.

As a variant, both devices may apply the modifications rules from a defined moment of the communication.

The devices may also apply the modification rules during a defined time period of the communication.

It is also possible that the modifications rules comprise a set of different modification rules, and the method may thus comprise having both devices apply different modifications rules of the set at different moments of the communication.

According to another aspect, a system is proposed, comprising at least a first contactless device and a second contactless device, the devices being configured to exchange during a contactless communication, frames having a frame format compliant with a contactless communication standard and comprising a start of frame field, an end of frame field, a payload and an error check field calculated from the payload according to a way compliant with the communication standard.

The first device comprises a first storage medium for storing modification rules, a first processor configured to, for at least a part of the communication, modify, in accordance with the modification rules, the content of at least one frame element of each frame of the at least a part of the communication so that the modified content of the at least one frame element is different from a reference content of the at least one frame element compliant with the communication standard, the at least one frame element including the start of frame field or the end of frame field or the payload field or the error check field, and a transmitter configured to send the modified frames to the second device.

The second device comprises a second storage medium for storing the modification rules, a receiver configured to receive the modified frames, and a second processor configured to analyze, within each modified frame, the at least one modified frame element in accordance with the modification rules, and to continue the communication if the at least one modified frame element is recognized.

According to an embodiment, the at least one frame element comprises the start of frame field.

According to an embodiment, the modification rules include a set of functions, and the first processor of the first device is configured to modify the content of at least one frame element comprises by applying at least one of these functions to the reference content of the at least one frame element to obtain the modified content different from the reference content.

According to an embodiment, the at least one frame element is the error check field, and the first processor of the first device is configured to modify the content of the error check field by calculating the content of the error check field in a different way than the one indicated in the communication standard.

According to an embodiment, the first processor of the first device and the second processor of the second device are configured to apply the modifications rules from the beginning of the communication.

According to an embodiment, the first processor of the first device and the second processor of the second device are configured to apply the modifications rules from a defined moment of the communication.

According to an embodiment, the first processor of the first device and the second processor of the second device are configured to apply the modifications rules during a defined time period of the communication.

According to an embodiment, the modifications rules comprise a set of different modification rules, and wherein the first processor of the first device and the second processor of the second device are configured to apply different modifications rules of the set at different moments of the communication.

According to another aspect, a device, for example a contactless reader, is proposed being the first device belonging to the system defined above.

According to another aspect, a device, for example a transponder, is proposed being the second device belonging to the system as defined above.

According to another aspect an object is proposed, for example belonging to the domain of Internet Of Things (IOT), including an antenna and a device, such as the second device, coupled to the antenna.

BRIEF DESCRIPTION OF THE DRAWINGS

Other advantages and features of the invention will appear in the detailed description below and in the appended drawings, which are not limitative, in which:

FIG. 16 illustrates standardized NFC frames being used at the beginning and end of the communication and modified NFC frames being used in between.

DETAILED DESCRIPTION OF ILLUSTRATIVE EMBODIMENTS

Figure 1:
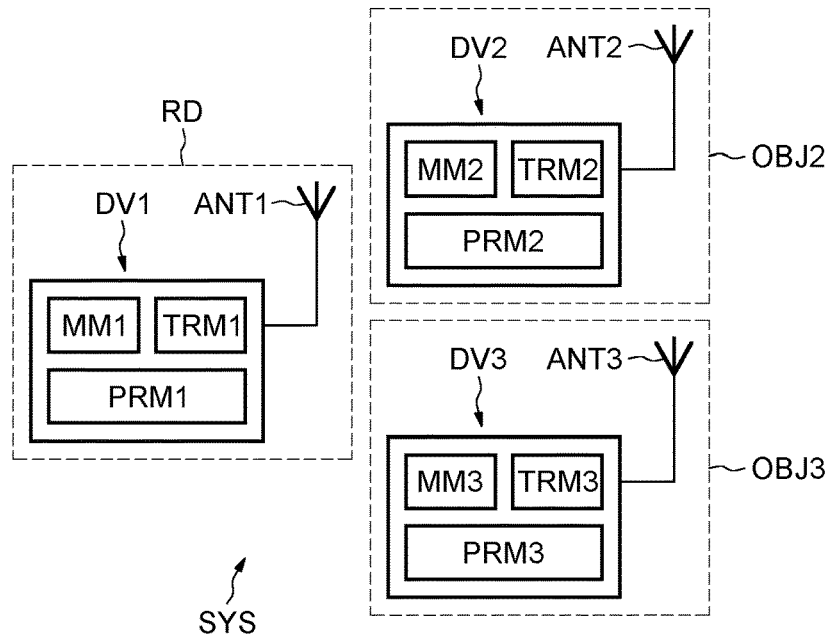
FIG. 1 illustrates a system including several contactless devices.

In FIG. 1, reference sign SYS designates a system including several contactless devices.

More precisely, an object, for example a contactless reader RD, includes a first contactless device DV1 coupled to a first antenna ANT1.

An object OBJ2, for example a transponder or tag, includes a second contactless device DV2 coupled to a second antenna ANT2.

Another object OBJ3, for example another tag, includes a third contactless device DV3 coupled to a third antenna ANT3.

In the present example, the system SYS uses the NFC technology for communications between the reader RD and the objects OBJ2 and OBJ3.

The first device DV1 comprises a first processor PRM1, for example an NFC controller, a first transmitter TRM1 configured in particular to perform modulation/demodulation of the RF carrier, and a first storage medium MM1, such as a non-transitory computer-readable memory.

The structure of the first transmitter TRM1 is conventional and known per se.

The second device DV2 comprises a second processor PRM2, for example, an NFC controller, a second transmitter TRM2, having a structure known per se, and configured in particular to perform the load modulation of the carrier, and a second storage medium MM2, such as a non-transitory computer-readable memory.

The third contactless device DV3 comprises a third processor PRM3, for example an NFC controller, a third transmitter TRM3, having a structure known per se and identical to the structure of the second processor PRM2, and a third storage medium MM3, such as a non-transitory computer-readable memory.

Of course, although only one device DV2 and only one device DV3 are represented in FIG. 1, the system SYS may comprise several devices DV2 and several devices DV3.

Figure 2:
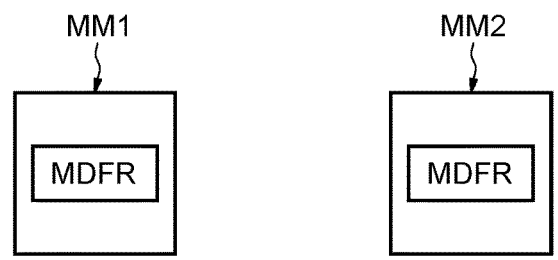
FIG. 2 illustrates first and second storage mediums storing modification rules.

As illustrated in FIG. 2, the first storage medium MM1 and the second storage medium MM2 store modification rules MDFR intended to be used, as it will be explained more in detail hereinafter, for modifying at least some frames exchanged during the communication between the reader RD and the object OBJ2 including the second contactless device DV2.

But the modification rules are not included in the third storage medium MM3 of the third device DV3.

Thus, as it will be explained more in details thereafter, the third device DV3 will not be able to process the modified frames sent by the reader RD.

Figure 3:
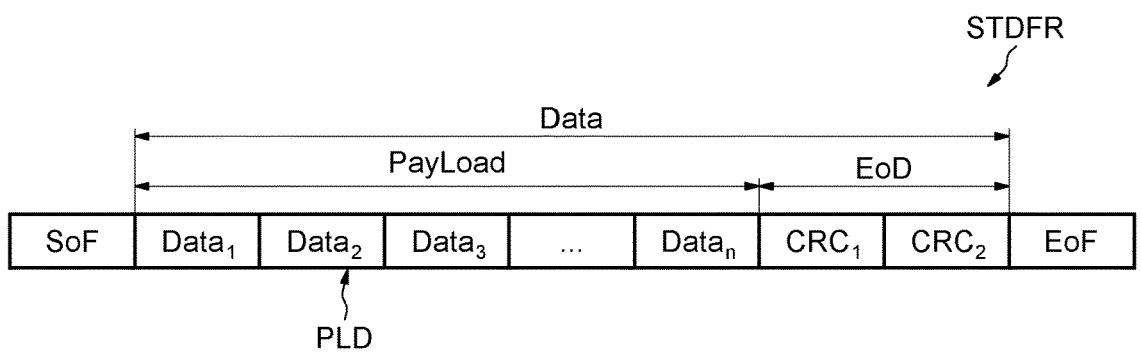
FIG. 3 illustrates a prior art standardized NFC frame.

FIG. 3 illustrates diagrammatically a standardized frame STD compliant with one of the standards used within the NFC platform.

Such standardized frame STDFR comprises a start of frame field SoF, a payload field PLD including the data sent or received within this frame, an error check field EoD including here two bytes CRC1 and CRC2. This error check field EoD permits to check transmission errors and is calculated from the payload PLD according to a way compliant with the used communication standard.

The standardized frame STD comprises also an end of frame field EoF.

The third contactless device DV3 is intended to interpret and process such standardized frame STDFR.

Figure 4:
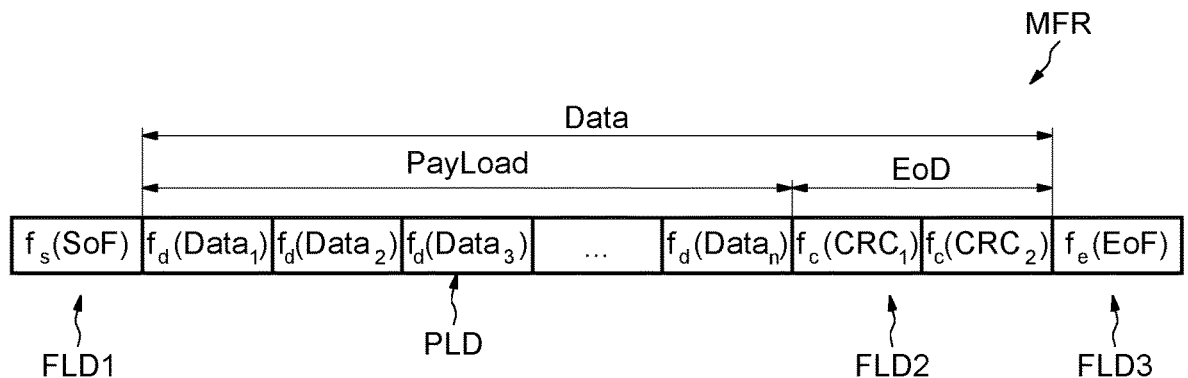
FIG. 4 illustrates an example modified frame that has been modified using the modification rules.

FIG. 4 illustrates diagrammatically an example of a modified frame MFR, which has been modified with respect to the standardized frame STDFR by using the modification rules MDFR.

As it will be explained more in detail thereafter, those modified frames MFR can be exchanged between the reader RD and the second device DVD from the beginning of the communication and during the whole communication, or only during a part of the communication, or only for specific commands.

Such modified frame MFR has the same format or structure as the one of the standardized frame STDFR. In other words, the format or structure of the modified frame MFR still comprises a start of frame field FLD1, a payload field PLD, an error check field FLD2 and an end of frame field FLD3.

However, the content of at least one frame element of the frame is modified with respect to the reference content of the corresponding frame element of a standardized frame STDFR.

In the example illustrated in FIG. 4, the contents of all frame elements of the frame have been modified.

However, it is possible to modify at least one frame element or some of the frame elements of the frame.

For example, only the start of frame field FLD1 may be modified while keeping the other frame elements unmodified.

It is also possible to modify only the end of frame field FLD3 or only the check error field FLD2.

As illustrated in FIG. 4, the modification rules may include a set of functions $f_s$, $f_d$, $f_c$ and $f_e$ respectively applied to the reference contents of the frame elements to obtain modified contents.

Figure 5:
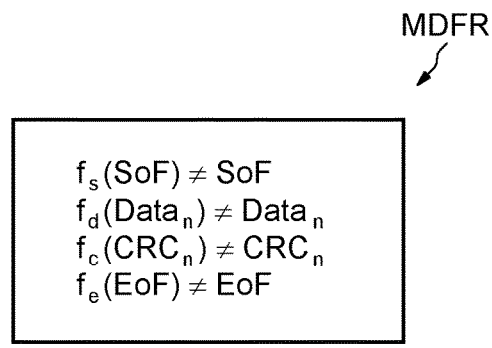
FIG. 5 illustrates modification rule functions.

As illustrated in FIG. 5, those functions $f_s$, $f_d$, $f_c$ and $f_e$ are chosen so that the modified contents obtained by applying these functions to the respective reference contents of the frame elements are different from these respective reference contents.

Figure 6:
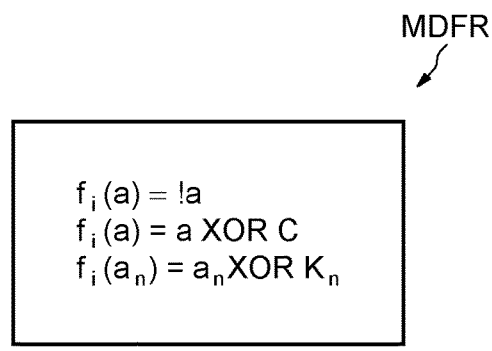
FIG. 6 illustrates modification rule functions.

For example, as illustrated diagrammatically in FIG. 6, such a function fi applying to a content "a" may be equal to !a (! meaning the logical NOT).

As a variant, such a function fi applied to the content "a" may be the logical XOR function of "a" with a constant C.

As a variant, the constant C may be replaced by different values $K_n$ respectively associated to the different contents an.

Figure 7:
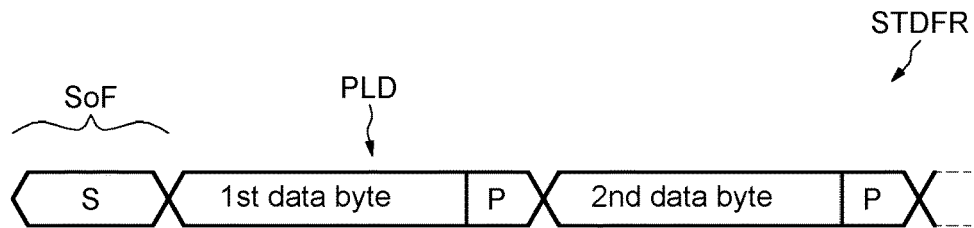
FIG. 7 illustrates a prior art standardized NFC frame.
Figure 8:
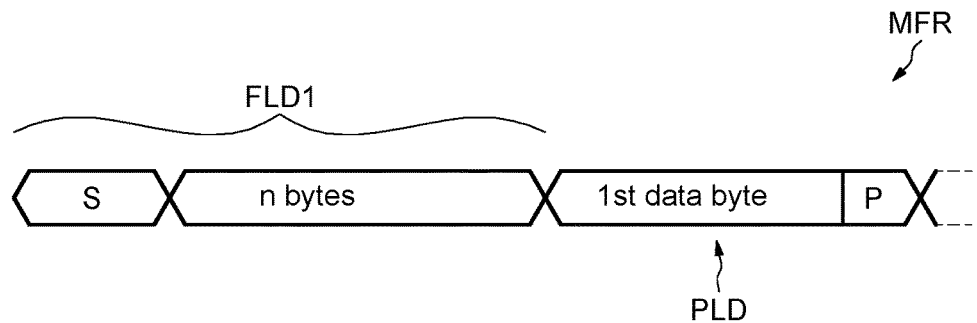
FIG. 8 illustrates a modified frame having a modified SOF field.

FIG. 8 illustrates another possible way for modifying the start of frame field SoF of a standardized frame STDFR illustrated in FIG. 7.

More precisely, in this example of standardized frame STDFR, the start of frame field SoF comprises S bits preceding the first data byte of the payload PLD (note that in FIG. 7, P designates a parity bit).

In the modified frame MFR of FIG. 8, the modified start of frame field FLD1 may comprise n bits added after the S bits.

Figure 9:
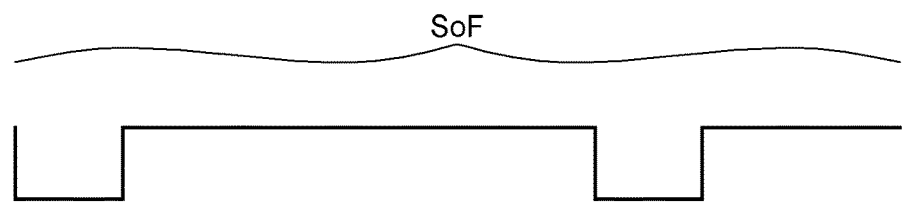
FIG. 9 illustrates a prior art standardized NFC frame.
Figure 10:
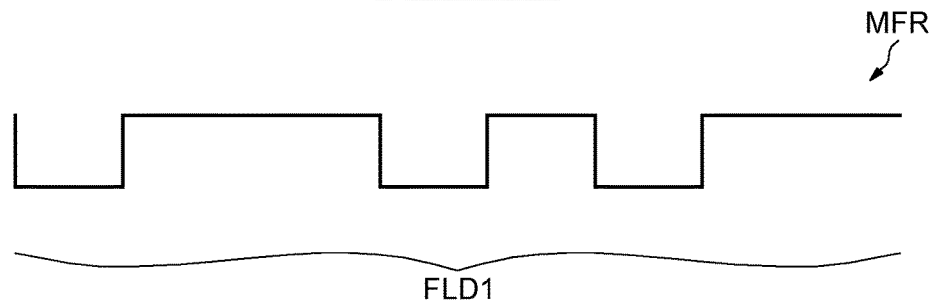
FIG. 10 illustrates modified frame having a modified SOF field.

FIG. 10 illustrates diagrammatically another example for modifying the start of frame field (or the end of frame field) of the example of standardized frame STDFR illustrated in FIG. 9.

In this example, compliant with the standard ISO 15 693, modulation pulses are used to signal the start of frame field SoF of a standardized frame FTDFR.

In FIG. 10, the modification rules may contain a modified pattern of those modulation pulses to signal the modified start of frame field FLD1.

Figures 11, 12:
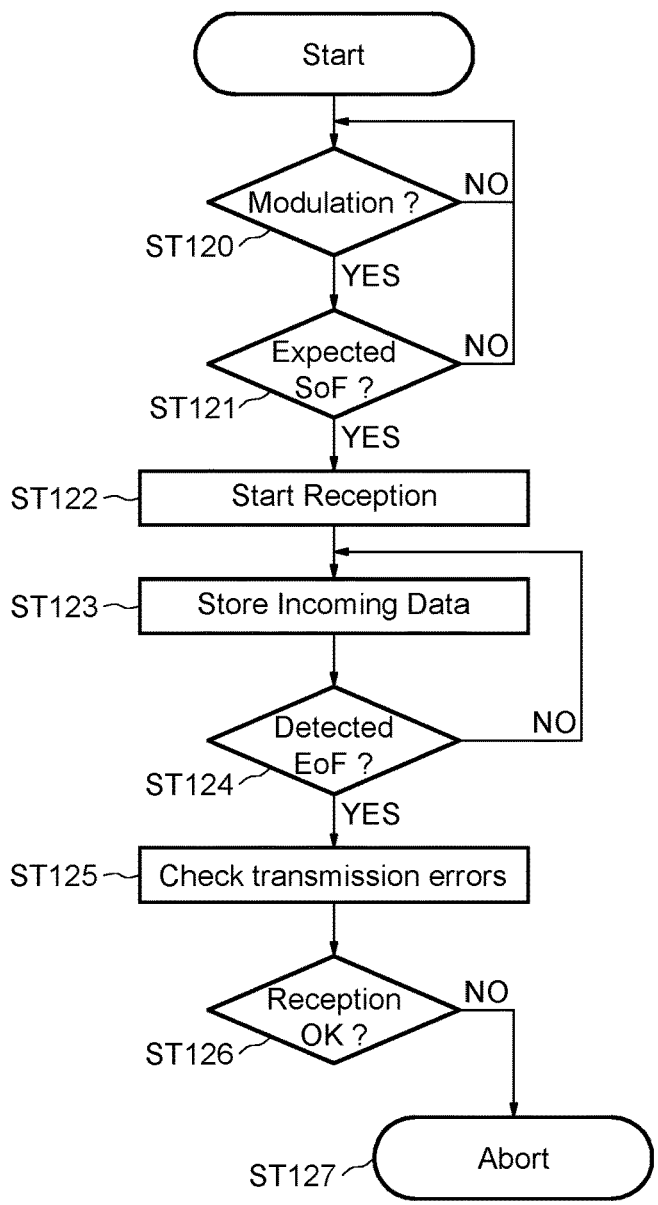
FIG. 11 illustrates various ways to modify the content of the error check field.
FIG. 12 illustrates a flow chart of communication management between the reader and the third device using modified frames.

Concerning the check error field, while it would be possible to calculate this check error field according to the way defined in the communication standard, and then applying a function to modify the obtained content of the check error field, it is also possible, as illustrated in FIG. 11, to modify the content of the error check field by calculating the content of this error check field in a different way than the one indicated in the communication standard.

More precisely, the error check field is usually calculated according to standard ISO13239 by using a polynomial and a standardized initial value STDIV.

This standardized initial value depends on the communication standard, which is used.

It is also possible to invert or not the result obtained.

And, for modifying the content of the check error field, it would be possible to modify the initial value and to use for example another initial value MIV.

For example, four initial values MIV0, MIV1, MIV2 and MIV3 respectively different from the standardized initial value STDIV associated to the four illustrated standards, may be used.

We refer now more particularly to FIG. 12 and following to illustrate an example of a communication management between the reader RD and the several devices DV2 and DV3.

FIG. 12 illustrates more particularly a communication management between the reader RD and the third device DV3, the reader using modified frames.

In step ST120, the device DV3 verifies the presence of the modulation.

If the modulation is present, the third processor PRM3 of the device DV3 analyzes the start of frame field SoF in step ST121.

If we assume that the start of frame field has been modified according to the modification rules, this modified start of frame field is not an expected start of frame SoF for the device DV3.

Thus, the frame is rejected and the communication is interrupted.

If for example, the start of frame field has not been modified in the modified frame and if we assume that the end of frame field has been modified, thus, step ST122 is performed including the start of reception.

The incoming data are stored in the device DV3 (step 123).

Then, a detection of the end of frame field EoF is performed in step ST124.

As the end of frame field has been modified, this modified end of frame field is not the expected end of frame field EoF and thus the end of frame field EoF is not detected by the device DV3.

Thus, again, the communication is interrupted.

If we assume that in the modified frame, only the check error field has been modified but neither the start of frame field nor the end of frame field, the end of frame field is detected in step ST124 and the transmission errors are checked in step ST125.

As the check error field does not correspond to a standardized check error field, the reception is not considered as being correct in step ST126 and the communication is aborted in step ST127.

Figure 13:
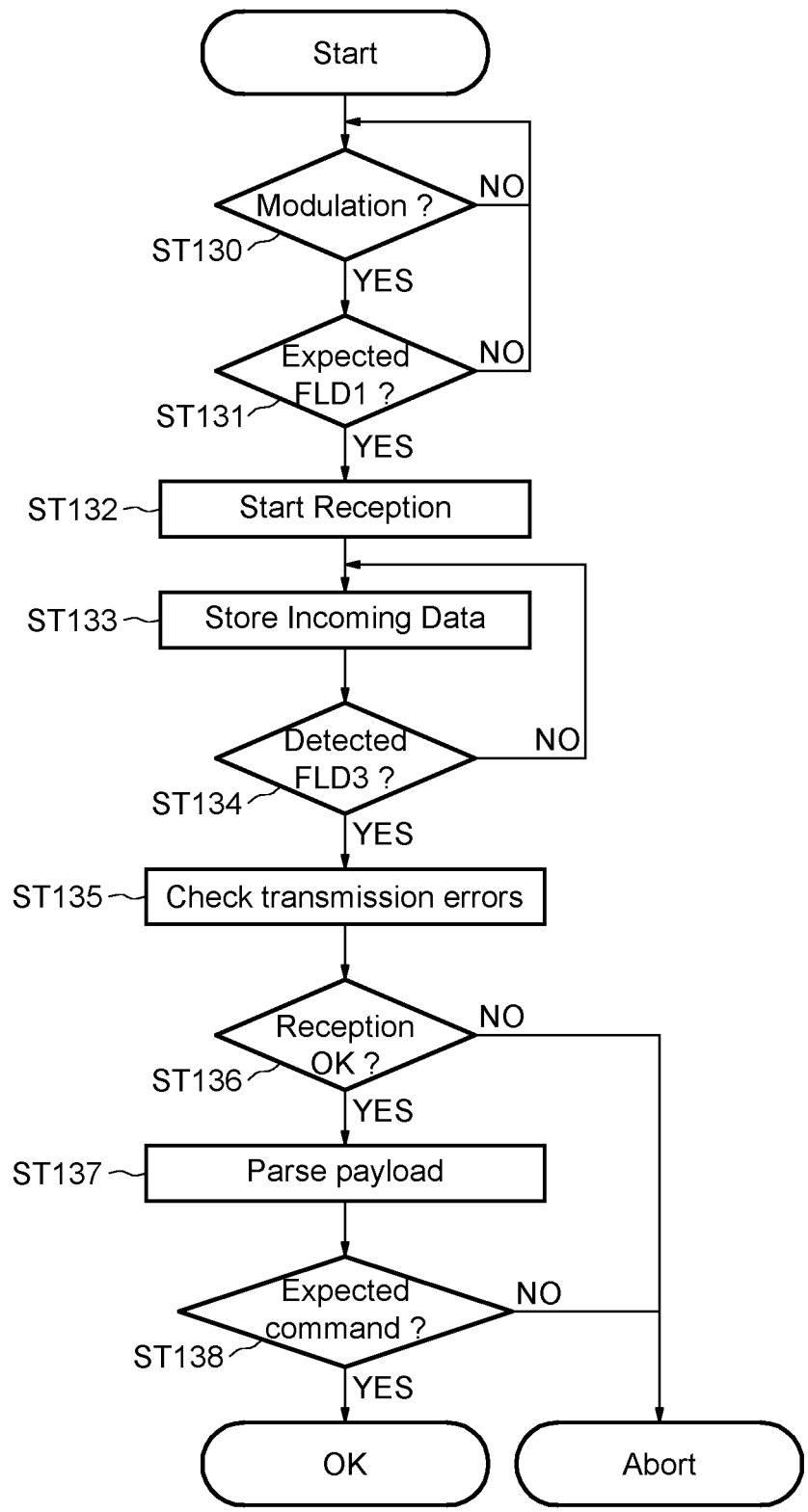
FIG. 13 illustrates a flow chart of communication management between the reader and the second device using modified frames.

FIG. 13 illustrates a communication management between the reader RD and the second device DV2 using modified frames.

In FIG. 13, we assume that the start of frame field, the check error field and the end of frame field have been modified according to the modification rules.

In step ST130, the presence of the modulation is verified.

If the modulation is present, the start of frame field FLD1 is analyzed and if this field FLD1 is the expected one in step ST131, the reception can be started in step ST132.

If the modified field FLD1 is not the expected one, thus, the frame is discarded and the communication is interrupted.

The incoming data are stored in step ST133.

And, in step ST134, the end of frame field FLD3 is analyzed.

If this field does not correspond to the expected field taking into account the modification rules, the communication is again interrupted.

Otherwise, the transmission errors are checked in step ST135.

If the received check error field FLD2 corresponds to the expected check error field, the reception is considered as being correct in step ST136 and the payload may be parsed in step ST137.

If the reception is not considered as being correct, communication is aborted.

In step ST138, if, for example the received command is not the expected one, the communication is also aborted.

Otherwise, the process continues.

In other words, with a modified frame, the reception process of an NFC system will likely discard incoming reception if expected SoF is not met (framing mismatch).

In case unexpected SoF is ignored, also the unforeseen EoF may also cause the frame to be disregarded.

In case framing errors are ignored (SoF and EoF), the data integrity check should raise a transmission error due to mismatched CRC field.

Thus, with modified NFC framing, only the desired recipient(s) (storing the modification rules) will be triggered, from an early moment of the actual reception, not relying on later processing at the application layer.

Thus, the use of the modified frames permits to give to some selected or desired devices (recipients) a certain level of security preventing in particular replay attacks.

Further, because the devices not implementing the modification rules cannot interpret the received modified frames and thus interrupt the communication, the energy consumed by the reader is reduced and the communication range with selected (desired) devices containing the modification rules is increased.

Figure 14:
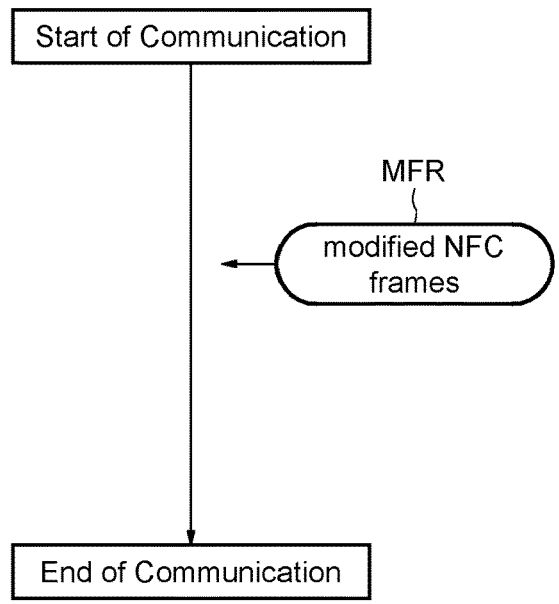
FIG. 14 illustrates modified NFC frames being used during the whole communication between the reader and the device.

Turning now to FIG. 14, it can be seen that the modified NFC frames MFR can be used during the whole communication between the reader and the device from the start of the communication until the end of the communication.

Figure 15:
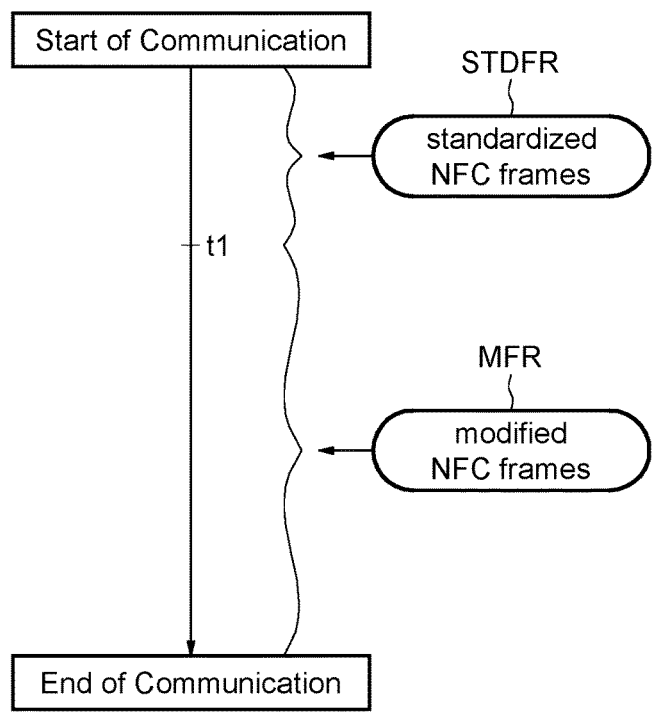
FIG. 15 illustrates standardized NFC frames being used for the first portion of the communication and modified NFC frames being for the latter portion of communication.

It is also possible as illustrated in FIG. 15, to use the standardized NFC frames STDFR from the beginning of the communication until a moment t1. And the modified NFC frames MFR are then used from t1 to the end of communication.

Figure 16:
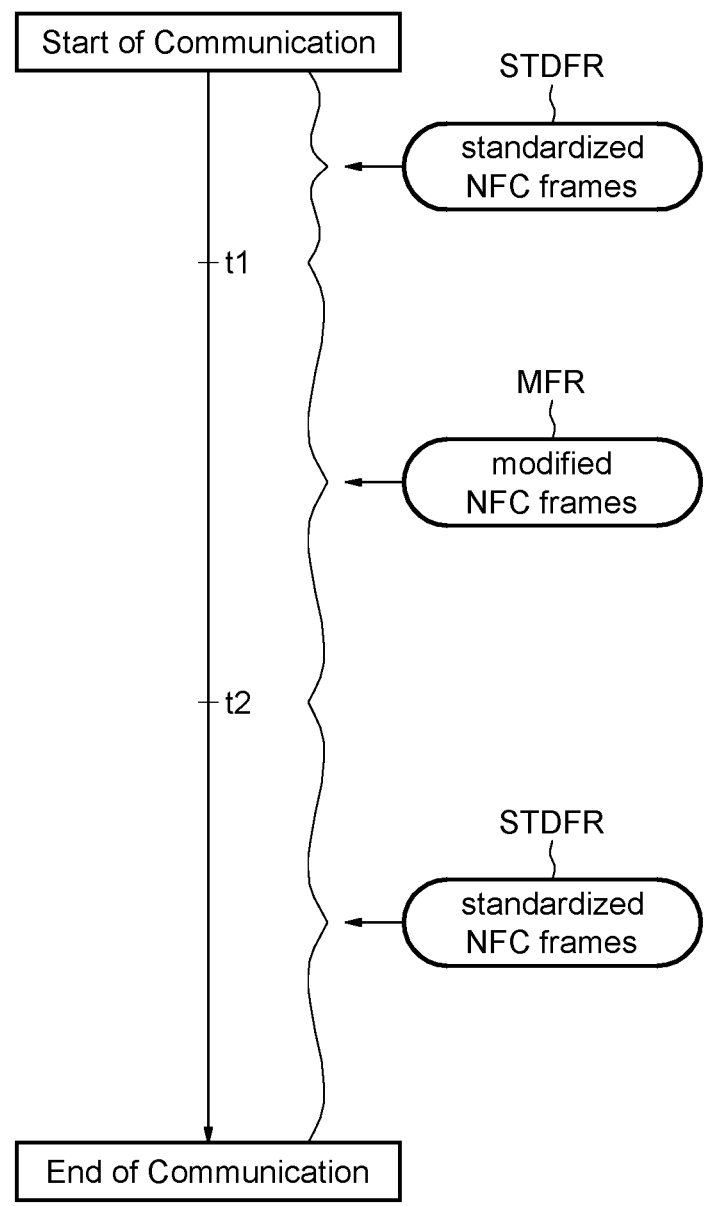

It is also possible as illustrated on FIG. 16 to use the modified NFC frames MFR between moment t1 and moment t2 of the communication while the standardized NFC frames STDFR are used during the other periods of the communication.

Figure 17:
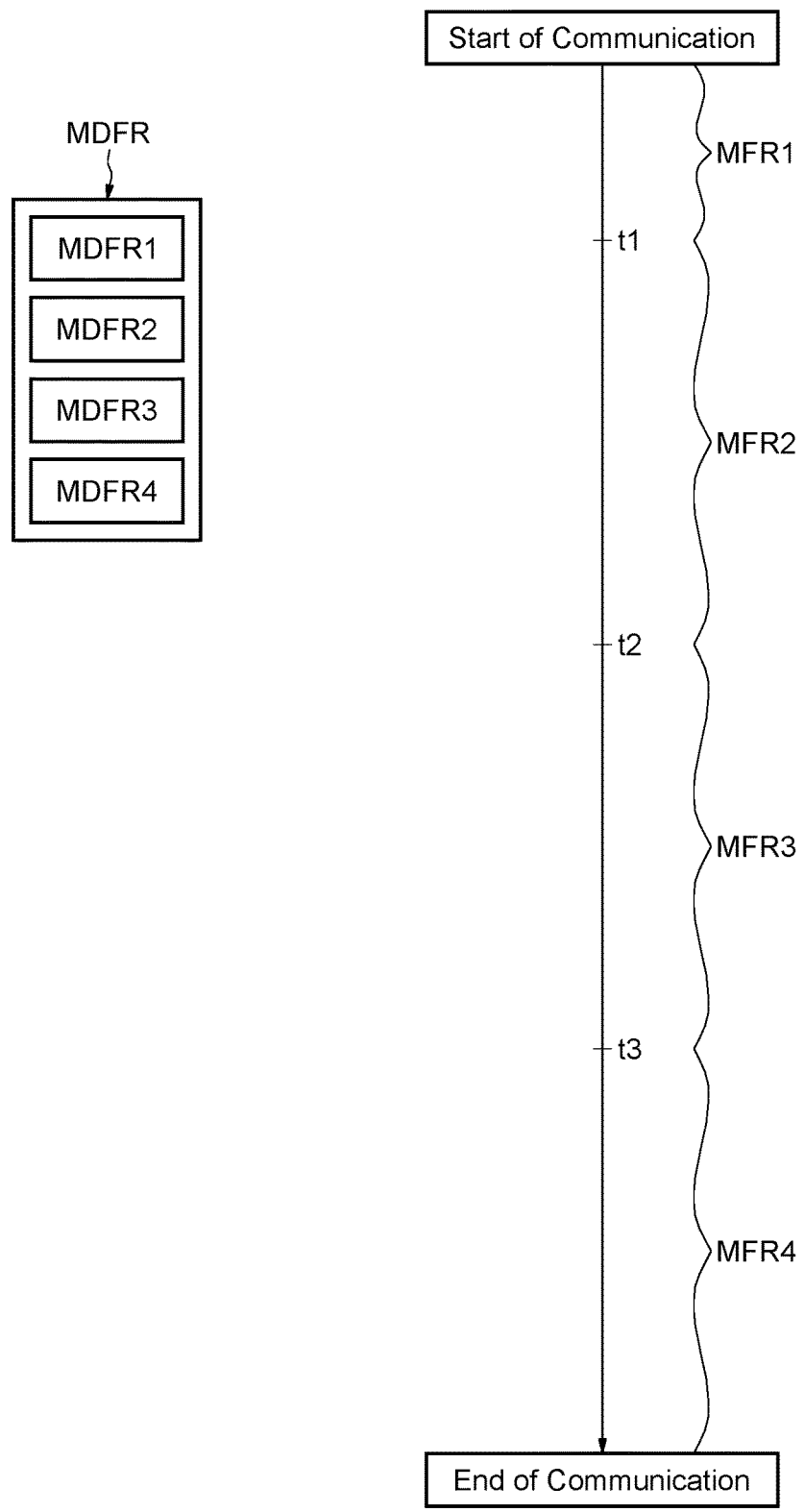
FIG. 17 illustrates different modification rules being used for different portions of the communication.

It is also possible, as illustrated in FIG. 17, that the modification rules MDFR comprise a set of different modification rules MDFR1-MDFR4.

And, as illustrated in FIG. 17, for example, the modified frame MFR1, modified according to the first set MDFR1 of modification rules are used from the beginning of the communication until moment t1.

The frame MFR2, modified according to the second set MDFR2 of modification rules would be used from t1 to t2.

The frames MFR3 modified according to the third set MDFR3 of modification rules would be used from t2 to t3 and the frame MFR4, modified according to the fourth set of modification rules MDFR4 would be used from t3 to the end of communication.

Those different moments can be programmed and stored in the reader and the selected devices DV2.

Those moments may be implemented by counters incremented or decremented from the beginning of the communication, or may correspond for example to the beginning or the end of specific phases of the communication (tag activation, anti-collision, obtention of the tag identifier (UID), etc.) or may correspond to the emission/reception of defined commands, these examples being not limitative.

As indicated above the reader and the selected devices DV2 share the modifications rules MFR, i.e. share a same configuration.

Several possibilities can be used for assign the modification rules or configuration to the reader and the corresponding selected devices.

It is thus possible to assign those modification rules during production of the reader and the selected devices DV2.

It is also possible to perform such an assignment during production, but which can be changed by manual operation.

For example, the modification rules can be changed in the reader by a software/firmware update and, in the selected devices DV2 (cards for example) by a contact interface compliant with the standard ISO7816.

It is also possible to perform the assignment during production and to change the modification rules MFR upon backend trigger.

More precisely, these modification rules may be changed in the reader by an automatic software/firmware update.

The modification rules in the contactless devices included in the cards for example, may be for example updated by the reader with dedicated RF commands.

What is claimed is:

1. A method for managing a communication between a first contactless device and a second contactless device, the method comprising:
   exchanging, by the first and second contactless devices during the communication, frames having a frame format compliant with a contactless communication standard and comprising a start of frame field, an end of frame field, a payload field, and an error check field calculated from the payload field in compliance with the communication standard;
   storing modification rules in both contactless devices;
   modifying, by the first contactless device, in accordance with the modification rules, a content of at least one frame element of each frame of the at least a part of the communication so that the modified content of the at least one frame element is different from a reference content of the at least one frame element compliant with the communication standard, the at least one frame element including the start of frame field or the end of frame field or the payload field or the error check field,
   sending, by the first contactless device, the frames having the modified content to the second contactless device,
   receiving, by the second contactless device, the frames having the modified content;

analyzing, by the second contactless device, the modified at least one frame element in accordance with the modification rules; and continuing, by the second contactless device, the communication in response to the second contactless device recognizing the modified at least one frame element.

2. The method according to claim 1, wherein the at least one frame element comprises the start of frame field.

3. The method according to claim 1, wherein the modification rules include a set of functions, and the modifying the content of the at least one frame element comprises applying at least one of the functions to the reference content of the at least one frame element to obtain the modified content different from the reference content.

4. The method according to claim 1, wherein the at least one frame element is the error check field, and modifying the content of the error check field comprises calculating the content of the error check field differently from the communication standard.

5. The method according to claim 1, further comprising applying, by both contactless devices, the modifications rules from a beginning of the communication.

6. The method according to claim 1, further comprising applying, by both contactless devices, the modifications rules from a defined moment during the communication.

7. The method according to claim 6, further comprising applying, by both contactless devices, the modification rules during a defined time period of the communication.

8. The method according to claim 1, wherein the modifications rules comprise a set of different modification rules, and the method comprises applying, by both contactless devices, different modifications rules of the set at different moments of the communication.

9. A first contactless device, wherein the first contactless device and a second contactless device are configured to exchange, during a contactless communication, frames having a frame format compliant with a contactless communication standard and comprising a start of frame field, an end of frame field, a payload field, and an error check field calculated from the payload field in compliance with the communication standard, wherein the first contactless device comprises:

a first storage medium configured to store modification rules;

a first processor configured to:

modify, in accordance with the modification rules, a content of at least one frame element of each frame of at least a part of the communication so that the modified content of the at least one frame element is different from a reference content of the at least one frame element compliant with the communication standard, the at least one frame element including the start of frame field, or the end of frame field, or the payload field, or the error check field; and a transmitter configured to send the frames having the modified content to the second contactless device.

10. The first contactless device according to claim 9, wherein the at least one frame element comprises the start of frame field.

11. The first contactless device according to claim 9, wherein the modification rules include a set of functions, and wherein the first processor configured to modify the content of the at least one frame element comprises the first processor configured to apply at least one of the functions to the reference content of the at least one frame element to obtain the modified content different from the reference content.

12. The first contactless device according to claim 9, wherein the at least one frame element is the error check field, and wherein the first processor is configured to modify the content of the error check field by calculating the modified content of the error check field differently from an error check field calculation of the communication standard.

13. The first contactless device according to claim 9, wherein the first processor is configured to apply the modifications rules from a beginning of the communication.

14. The first contactless device according to claim 9, wherein the first processor is configured to apply the modifications rules from a defined moment during the communication.

15. The first contactless device according to claim 14, wherein the first processor is configured to apply the modifications rules during a defined time period of the communication.

16. The first contactless device according to claim 9, wherein the modifications rules comprise a set of different modification rules, and wherein the first processor is configured to apply different modifications rules of the set at different moments of the communication.

17. The first contactless device according to claim 9, wherein the first contactless device is a contactless reader.

18. A second contactless device, wherein the second contactless device and a first contactless device are configured to exchange, during a contactless communication, frames having a frame format compliant with a contactless communication standard and comprising a start of frame field, an end of frame field, a payload field, and an error check field calculated from the payload field in compliance with the communication standard, wherein the second contactless device comprises:

a second storage medium configured to store modification rules;

a receiver configured to receive modified frames from the first contactless device, wherein a content of at least one frame element of each frame of at least a part of the communication is modified, in accordance with the modification rules, so that the modified content of the at least one frame element is different from a reference content of the at least one frame element compliant with the communication standard, the at least one frame element including the start of frame field, or the end of frame field, or the payload field, or the error check field; and a second processor configured to:

analyze, within each modified frame, the modified at least one frame element in accordance with the modification rules; and continue the communication in response to the modified at least one frame element being recognized.

19. The second contactless device according to claim 18, wherein the at least one frame element comprises the start of frame field.

20. The second contactless device according to claim 18, wherein the modification rules include a set of functions, wherein the modified content of the at least one frame element is derived from at least one of the functions being applied to the reference content of the at least one frame element, and wherein the modified content is different from the reference content.

21. The second contactless device according to claim 18, wherein the at least one frame element is the error check field, and wherein the modified content of the error check field is calculated differently from an error check field calculation of the communication standard.

22. The second contactless device according to claim 18, wherein the second processor is configured to apply the modifications rules from a beginning of the communication.

23. The second contactless device according to claim 18, wherein the second processor is configured to apply the modifications rules from a defined moment during the communication.

24. The second contactless device according to claim 23, wherein the second processor is configured to apply the modifications rules during a defined time period of the communication.

25. The second contactless device according to claim 18, wherein the modifications rules comprise a set of different modification rules, and wherein the second processor is configured to apply different modifications rules of the set at different moments of the communication.

26. The second contactless device according to claim 18, wherein the second contactless device is a transponder.

27. The second contactless device according to claim 18, further comprising an antenna coupled to the receiver.

* * * * *